United States Patent [19]

Pattridge

[11] Patent Number: 4,533,421

[45] Date of Patent: Aug. 6, 1985

[54] METHOD FOR MAKING A LAP SEAM EXTRUDED TENDON

[75] Inventor: David Pattridge, Shreveport, La.

[73] Assignee: Pattridge Post Tension, Inc., Shreveport, La.

[21] Appl. No.: 603,760

[22] Filed: Apr. 25, 1984

[51] Int. Cl.³ .............................................. B29C 19/00
[52] U.S. Cl. ........................ 156/244.12; 156/244.23; 156/244.24; 264/174
[58] Field of Search .................. 156/244.12, 244.23, 156/244.24, 200, 203; 264/173, 174

[56] References Cited

U.S. PATENT DOCUMENTS

| | | | |
|---|---|---|---|
| 3,646,748 | 3/1972 | Lang | 57/149 |
| 3,654,027 | 4/1972 | Middleton | 156/200 |
| 4,331,499 | 5/1982 | Madsen et al. | 156/203 |
| 4,478,670 | 10/1984 | Heyse et al. | 156/203 |

OTHER PUBLICATIONS

The Journal of Concrete Society, vol. 2, No. 2, Feb. 1968.
Illustration of Tendon made by the Process of U.S. Pat. No. 3,654,027.
Depiction of the Prior Art Paper-wrapped Tendon.

*Primary Examiner*—Jay H. Woo
*Assistant Examiner*—Timothy W. Heitbrink
*Attorney, Agent, or Firm*—Arnold, White & Durkee

[57] ABSTRACT

A method and die arrangement are disclosed for making a seamed plastic jacket for a tendon suitable for various applications, such as post tensioning concrete. In the method, a heated, curled, discontinuous strip of plastic material is extruded around a moving strand which has been previously coated with a corrosion inhibitor. The discontinuous strip, which includes ends that overlap, is then pulled down around the moving strand and pressure is applied to the overlapping sections to form a seal.

7 Claims, 6 Drawing Figures

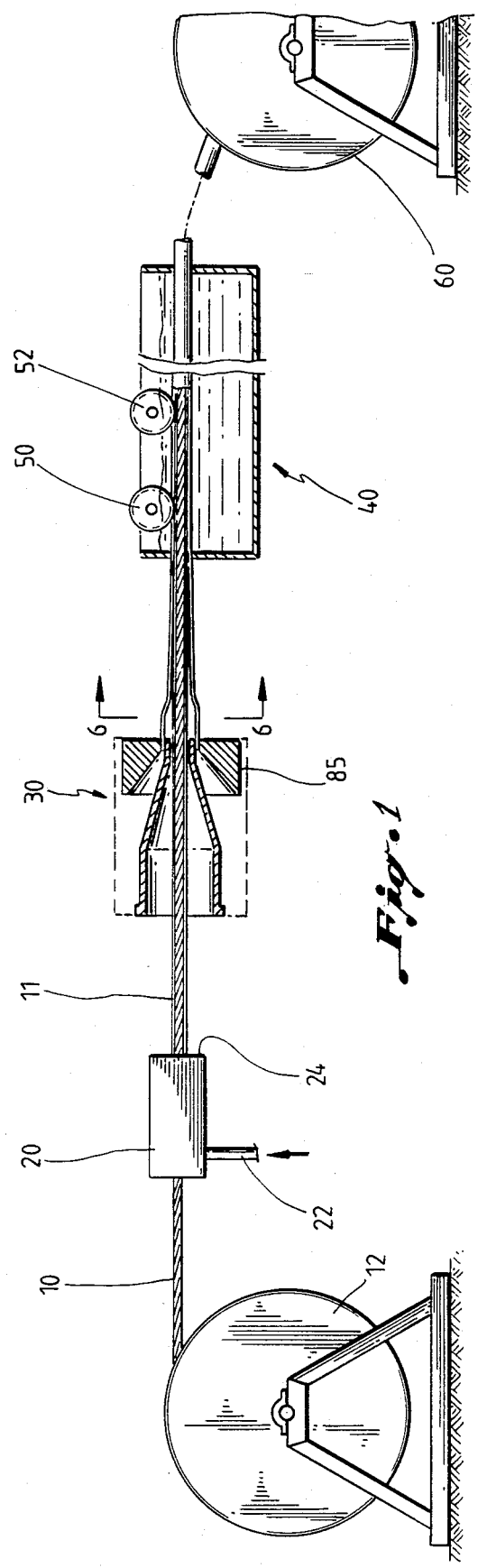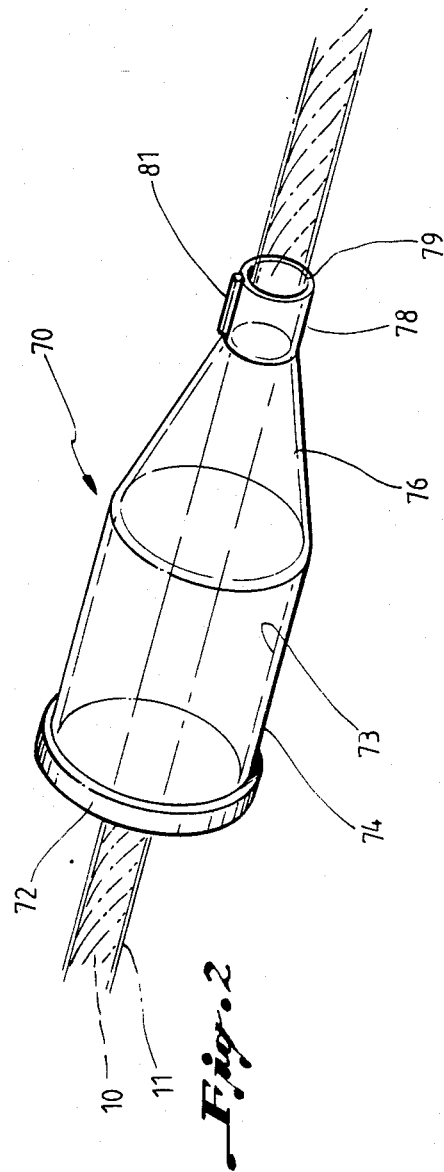

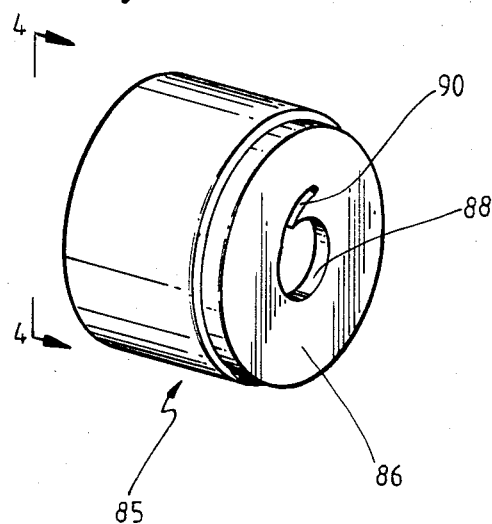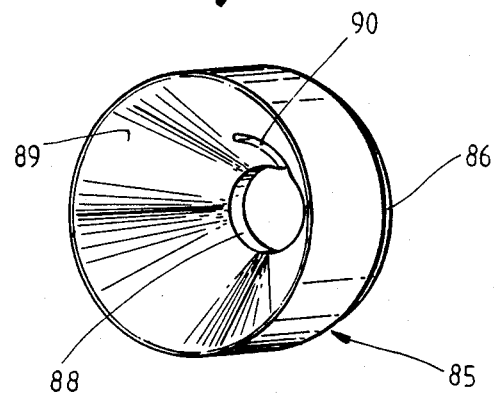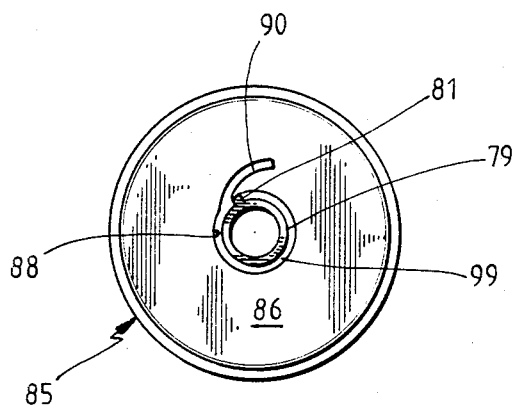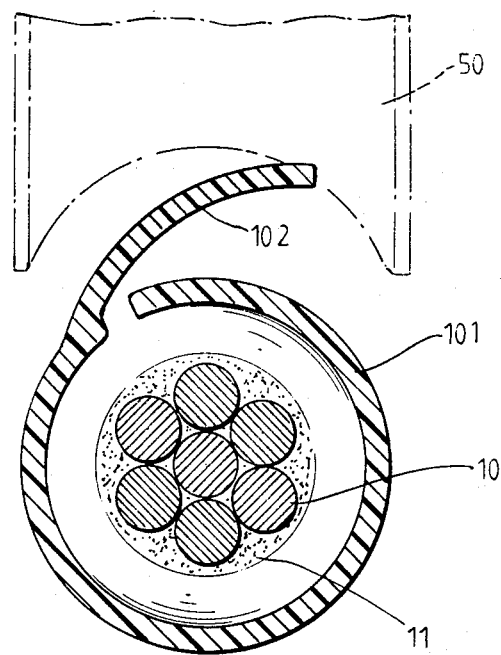

4,533,421

METHOD FOR MAKING A LAP SEAM EXTRUDED TENDON

BACKGROUND OF THE INVENTION

This invention relates generally to a method and extrusion die for forming a tendon suitable for various applications, including post tensioning concrete. More particularly, this invention relates to a method and die arrangement for forming a post tensioning tendon which includes a central, multiple-wire strand coated with a corrosion inhibitor and then encased within a plastic jacket which includes a seam.

Various attempts have been made toward the manufacture of a cost-effective post tensioning tendon which includes a multiple-wire strand and is capable of good handling characteristics in the field. Probably one of the earliest attempts was a paper-wrapped tendon. That tendon included a seven-wire strand coated with a corrosion inhibitor and then spirally wrapped with some type of paper, usually a reinforced paper. However, this paper-wrapped tendon exhibited various shortcomings. For example, the paper would develop tears in the jacket, resulting in the leakage of the corrosion inhibitor which could develop unsightly stains on concrete. Also, when the paper-wrapped tendon was placed in the forms, the weight of the concrete could force the paper into the interstices of the multiple-wire strand, creating a mechanical interlock inside the tendon which reduced the effectiveness of the tendon during tensioning of the strand for the reinforcement of the concrete.

In response to the problems associated with the paper-wrapped tendon, other tendons were developed, including the push-through tendon and the lap-seam or cigarette-wrapped tendon. Again, both of these tendons included disadvantages.

The push-through tendon was made in a process which included the application of a corrosion inhibitor to the strand and then inserting the coated strand into a previously manufactured plastic tube. By its very nature, this manner of production was slow and therefore resulted in relatively high manufacture and labor costs. Also, an air gap typically resulted in the push-through tendon as a result of the method of manufacture, because of the desirability to make the internal dimension of the plastic tube greater than the outer diameter of the coated strand in order to facilitate the insertion of the strand into the tube. This necessarily resulted in an air gap within the tendon. That air gap may permit the intrusion of moisture into the tendon that can result in long-term corrosion.

The lap-seam tendon was made in a method where a corrosion inhibitor is applied to a multiple-wire strand and then a previously-formed strip of plastic material is curled around the coated strand. As the plastic material is curled around the strand, heat is applied to the overlapping edges of the strip and then the overlapping edges are pressed together to form a seam. This process of manufacture also results in relatively high production costs. Additionally, this product had the tendency to develop splits along the seam, again permitting the intrusion of moisture for long term corrosive effects. Further, because an air gap typically exists within the jacket of the lap-seam tendon, this tendon exhibited undesirable handling characteristics in the field, because the coated strand tended to slip inside the jacket or the jacket could inadvertently and somewhat easily be slipped off the strand in the field at times.

One attempt to overcome the problems of the paper-wrapped, the push-through, and lap-seam tendons is set forth in U.S. Pat. No. 3,646,748. In general, this patent discloses a post tensioning tendon which is made in a process by extruding a seamless, plastic, tubular jacket around a coated strand. Because the method of this patent can be conducted in a continuous process at relatively high speeds, manufacturing costs can be reduced. Also, the jacket formed in this process is tightly in engagement with the coated strand, eliminating the undesirable handling characteristics associated with the lap-seam and push-through tendon with respect to the jacket inadvertently slipping off the strand because of the air gap within the tendon. However, substantial license fees are required for practicing the process of making the product covered by U.S. Pat. No. 3,646,748.

SUMMARY OF THE INVENTION

The present invention overcomes many of the disadvantages of the prior art tendons through the use of a method for making such tendon by, first, coating a multiple-wire strand with a corrosion inhibitor. That coated strand is then moved through the crosshead of an extruder, where a heated, curled, discontinuous strip of plastic material is extruded around the moving, coated strand such that at least a portion of the ends of the extruded strip overlap. Downstream of the extruder, the curled plastic strip is then pulled down around the moving coated strand to form a jacket for the tendon and pressure is applied to the overlapping sections of the plastic strip to facilitate the formation of a seal between those overlapping sections.

In more particular aspects of the invention, the corrosion inhibitor has a grease-like consistency relative to worked penetration and flow characteristics. That corrosion inhibitor is preferably smoothed and shaped to provide a generally circular configuration around the multiple-wire strand, in order to provide a circular support for the plastic strip as it is pulled down into contact with the coated strand. In accordance with the preferred embodiment, the step of applying pressure to the overlapping plastic sections is accomplished by at least one roller; more preferably, two rollers are spaced along the direction of movement of the strand. The claimed method is particularly advantageous over the prior art method of forming a lap-seam tendon, because the seal is formed between the overlapping sections of the plastic material by utilizing the heat of the plastic from the extrusion process.

In another aspect of the invention, an extrusion die and wire guide are provided for forming a heated, curled, discontinuous strip of plastic material which becomes the jacket for the tendon. The die is generally shaped in the form of an annulus and includes, first, a generally planar front face. A flow surface is provided internally of the die such that the flow surface converges toward the die's front face. A generally circular opening extends from the front face of the die to the converging flow surface and an additional opening is provided in the front face, extending through the die to the flow surface. That additional opening generally has an arc-shape and mates at one of its ends with the circular opening.

The wire guide includes a tapering flow surface, at least a portion of which fits within the converging flow surface of the die. A generally tubular flow surface extends forwardly of the tapering flow surface and terminates in a generally planar front face, which is generally planar with the front face of the die when the die and wire guide are assembled for use. In significant contrast to prior wire guide arrangements, the wire guide of the present invention further includes a generally radial projection on the tubular flow surface. That projection abuts against the circular opening of the die adjacent the intersection between the circular opening and the additional opening, so that a discontinuous flow channel is formed between the die and the wire guide.

Accordingly, the present invention overcomes many of the disadvantages associated with the prior art paper-wrapped, lap-seam, and push-through tendons, while maintaining various advantages associated with the extrusion process for forming a post-tensioning tendon. Specifically, the present invention affords the ability to operate at essentially the same production speeds and production costs of prior extrusion methods. The present invention also exhibits the handling characteristics of an extruded tendon, in the sense that the jacket is tight in engagement with the coated strand so that the strand will not have a tendency to inadvertently slip out of the jacket in the field. Also, with the jacket being in tight engagement with the coated strand, the air gap associated with prior art lap-seam and push-through tendons is eliminated, thereby eliminating the access opening for moisture which could have long term corrosive effects. Further, because the jacket is extruded as an open, discontinuous, curled strip of plastic material which is then pulled down into contact with the coated strand, the process may provide the ability to exclude more air from within the jacket over tendons made in prior extrusion processes.

These and other advantages and meritorious features will be more fully appreciated from the following detailed description and the claims.

BRIEF DESCRIPTION OF THE DRAWINGS

FIG. 1 is a schematic illustration which depicts the overall process of the present invention.

FIG. 2 is a perspective view of the wire guide of the present invention.

FIG. 3 is a perspective view of the die of the present invention, depicting its front face and the openings in the front face.

FIG. 4 is a perspective view of the die, depicting the converging flow surface within the die.

FIG. 5 is a frontal planar view, illustrating the positioning of the die and wire guide when those components are assembled.

FIG. 6 is a cross sectional illustration, taken along plane 6—6 as shown in FIG. 1, and illustrates the general configuration of the heated, curled, discontinuous strip of plastic material as it is extruded and prior to the time that it is pulled down into contact with the coated strand.

DETAILED DESCRIPTION OF THE PREFERRED EMBODIMENT

FIG. 1 generally illustrates the overall process of the present invention. In that process a multiple-wire strand 10 is paid off a reel 12 and fed through a grease applicator 20. From there, the coated strand then travels through the crosshead 30 of an extruder, where a discontinuous, curled strip of plastic material is extruded around the coated strand. The plastic covered, grease-coated strand then travels through a cooling zone, preferably a water trough 40. In that cooling zone, pressure is applied to the plastic strip to form a seam in the jacket by a pair of rollers 50 and 52, prior to the final product being taken up on a reel 60.

Turning now to more specific details of the various aspects of the invention, the multiple-wire strand 10 is preferably a seven-wire strand comprised of a central wire around which six wires are spirally wrapped. After that multiple-wire strand 10 is paid off reel 12, the strand enters an opening (not shown) in the grease applicator 20. A corrosion inhibitor is pumped into the applicator 20 under pressure by an inlet port 22 so that the strand will be adequately and properly coated as it exits a port on the downstream side 24 of the applicator 20. Preferably, the corrosion inhibitor has a grease-like consistency relative to worked penetration and flow characteristics so that the corrosion inhibitor will generally maintain its shape provided by the exit port of the applicator 20. Applicator 20 can take the general shape and configuration of conventionally used applicators in order to provide a smoothing and shaping function for the corrosion inhibitor to form a generally circular configuration of the inhibitor around the multiple-wire strand.

The grease-coated strand then travels through the crosshead 30 (shown in dashed lines) of an extruder, which includes a wire guide 70 that is generally concentrically located within a die 85.

The wire guide 70 is depicted more specifically in FIG. 2 and takes on an elongated, generally tubular shape. An annular flange 72 is provided on the wire guide 70 for purposes of mounting the guide in a conventional manner within the crosshead. An opening 73 extends through the length of the wire guide to permit the coated strand to pass therethrough. The outer surface of the wire guide 70 includes a generally circular portion 74 around which molten plastic material flows in a conventional crosshead manner prior to exiting the annulus formed between the wire guide and die. That annulus 99 is illustrated in FIG. 5 and, as will be more fully explained in the following portions of this description, takes on the configuration of a discontinuous flow channel.

The wire guide 70 further includes a converging, essentially conical flow surface 76 which extends between the circular surface 74 and another generally circular surface 78 formed by a generally tubular section of the wire guide, terminating in a generally planar front face 79. A significant feature of the wire guide, which differentiates it from wire guides of the prior art, includes a radial projection 81 on the tubular flow surface 78. This projection 81 should extend from the planar surface 79 on the wire guide to preferably about the region of the converging flow surface 76. As will become more apparent from later portions of this disclosure, the radial projection 81 provides a discontinuity in the flow of plastic such that the plastic material, as it is extruded from the wire guide 70 and die 85, is not a tube.

FIGS. 3 and 4 more specifically depict the die 85, which generally has an annulus shape. The die 85 includes a generally planar front face 86 which includes a circular opening 88 therein. As illustrated in FIG. 4, a flow surface 89 is provided internally of the die and converges toward the front face. As can be seen in FIG. 3, the circular opening 88 extends from the front face of the die to the converging flow surface.

A feature of the die 85, which significantly distinguishes it from the conventional dies, is an additional opening 90 extending from the front face of the die rearwardly through the die to the converging surface 89. That additional opening generally has an arc shape for the purpose of forming an overlapping section of the jacket.

FIG. 5 illustrates the preferable orientation of the wire guide 70 and die 85 when those components are mounted for use within the crosshead of an extruder. Die 85 is held in position within the crosshead by four radial set screws (not shown), which bear upon the outer surface of the die. As illustrated, the radial projection 81 is positioned at approximately the eleven o'clock position at a point of intersection between the circular opening 88 and the arc-shaped opening 90. This particular orientation enable the plastic section formed by the opening 90 to gradually be pulled down into contact with the plastic section underneath that plastic material, rather than being pulled away from the underlying plastic material.

As illustrated in FIG. 5, the annulus 99 formed by the die and wire guide takes on the shape of a discontinuous opening, rather than a tubular configuration. The plastic material just outside the crosshead will generally conform to the shape of the annulus 99, as illustrated in FIG. 6. As depicted in that figure, the multiple-wire strand 10 is coated by a corrosion inhibitor 11 which generally has an overall circular shape. The plastic jacket just outside the die is discontinuous, and includes a generally circular portion 101 and integral flap 102 formed by the opening 90 in the die. The integral flap 102 overlaps at least a portion of the other end of the plastic material, so that a seal can be formed between the plastic material downstream.

In the performance of the process, the plastic jacket is pulled or drawn down, by the moving coated strand, to form a jacket for the tendon. Pressure is applied to the overlapping flap 102 by rollers 50 and 52, to utilize the heat of the plastic material from the extrusion process in order to form a seam or seal between the flap 102 and the underlying plastic material. Rollers 50 and 52 can be stationarily mounted or mounted such that the rollers are permitted to move a limited vertical amount under a biasing pressure in order to accommodate the naturally occurring, fluctuating movement of the tendon in the manufacturing process yet to provide a proper pressure on the flap 102 to achieve a desired seal. The rollers should preferably include an arc to generally conform to the outer surface of the tendon, as illustrated in dashed lines in FIG. 6.

As illustrated in FIG. 1, the rollers 50 and 52 are preferably mounted in the region of a cooling trough 40, through which water is circulated to reduce the temperature of the plastic material of the jacket prior to being taken up on reel 60. Most preferably, roller 50 is positioned adjacent the point where the tendon enters the water trough. At that point, the plastic material has cooled sufficiently so that the application of pressure does not interfere with the formation of the jacket, yet the plastic material still retains enough heat to enable the formation of a proper seal between the flap 102 and the underlying plastic section of the jacket. Of course, the exact position of roller 50 will depend upon the particular operating parameters of the process, but in the preferred embodiment, this roller is positioned approximately three to four feet from the exit point of the extruded crosshead.

As will be appreciated, various modifications or alterations can be made to the described process and apparatus, without deviating from the overall inventive scope disclosed herein. For example, roller 52 might be eliminated in the event that sufficient pressure is applied by way of roller 50. Conversely, additional rollers might be provided in order to achieve the desired seal in the jacket. Further, various alternations could be made to the particular configuration of the die and wire guide to achieve the discontinuous annulus at the exit port of the extruder crosshead, while still maintaining overlapping plastic sections of the plastic strip to enable the formation of a seam in the jacket.

What is claimed is:

1. A method of making a tendon suitable for post tensioning concrete and for use in other applications, comprising the steps of:

coating a multiple-wire strand with a corrosion inhibitor;

moving the coated strand through a crosshead of an extruder;

extruding a heated, curled, discontinuous strip of plastic material from the crosshead and generally coaxially around the moving, coated strand such that the plastic material generally encircles the coated strand, with at least a portion of the ends of the extruded strip overlapping, and at least a portion of the overlapping end sections being in the upper portion of the curled strip as viewed in cross section;

pulling the curled plastic strip by the moving coated strand to form a jacket around the coated strand for the tendon; and applying pressure to the overlapping sections of the plastic strip and using the heat of the plastic material from the extrusion step to facilitate the formation of a seal therebetween.

2. The method as defined in claim 1, wherein the corrosion inhibitor has a grease-like consistency relative to worked penetration and flow characteristics.

3. The method as defined in claim 2, further including the step of smoothing and shaping the corrosion inhibitor to provide a generally circular configuration around the multiple-wire strand.

4. The method as defined in claim 1, wherein pressure is applied to the overlapping plastic sections by a roller.

5. The method as defined in claim 3, wherein pressure is applied to the overlapping plastic sections by a roller.

6. The method as defined in claim 1, wherein pressure is applied to the overlapping plastic sections by at least two rollers, spaced along the direction of movement of the strand.

7. The method as defined in claim 3, wherein pressure is applied to the overlapping plastic sections by at least two rollers, spaced along the direction of movement of the strand.

* * * * *